United States Patent
Hang et al.

(10) Patent No.: US 9,385,603 B2
(45) Date of Patent: Jul. 5, 2016

(54) CONTROL METHOD AND CONTROL CIRCUIT FOR SWITCHING POWER SUPPLY

(71) Applicant: Silergy Semiconductor Technology (Hangzhou) LTD, Hangzhou, ZheJiang Province (CN)

(72) Inventors: Kailang Hang, Hangzhou (CN); Liangwei Sun, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 56 days.

(21) Appl. No.: 14/547,034

(22) Filed: Nov. 18, 2014

(65) Prior Publication Data

US 2015/0145490 A1    May 28, 2015

(30) Foreign Application Priority Data

Nov. 26, 2013   (CN) .......................... 2013 1 0615689

(51) Int. Cl.
*H02M 3/156* (2006.01)
*H02M 3/158* (2006.01)
*H02M 1/00* (2006.01)

(52) U.S. Cl.
CPC ...... *H02M 3/158* (2013.01); *H02M 2001/0032* (2013.01); *Y02B 70/16* (2013.01)

(58) Field of Classification Search
CPC .................... H02M 2003/1557; H02M 3/156; H02M 3/1563; H02M 3/158; H02M 3/1588; H02M 2001/0025; Y02B 70/1466
USPC .......................................... 363/282, 284, 288
See application file for complete search history.

(56) References Cited

U.S. PATENT DOCUMENTS

| | | | | |
|---|---|---|---|---|
| 5,367,247 A * | 11/1994 | Blocher | .................... | G05F 1/38 323/222 |
| 7,457,140 B2 * | 11/2008 | Klein | .................... | H02M 3/158 232/225 |
| 8,067,925 B2 | 11/2011 | Grimm | | |
| 8,710,905 B2 | 4/2014 | Chen | | |
| 2008/0030181 A1 * | 2/2008 | Liu | ........................ | H02M 3/157 323/283 |
| 2008/0224681 A1 * | 9/2008 | Padure | ................. | H02M 3/1588 323/288 |
| 2011/0273156 A1 * | 11/2011 | Miyamae | .............. | H02M 3/156 323/288 |
| 2013/0313974 A1 | 11/2013 | Fan et al. | | |
| 2014/0198540 A1 | 7/2014 | Xu | | |

* cited by examiner

*Primary Examiner* — Gary L Laxton
(74) *Attorney, Agent, or Firm* — Michael C. Stephens, Jr.

(57) ABSTRACT

In one embodiment, a method of controlling a switching power supply can include: (i) generating an ideal on time signal according to an input voltage and an output voltage of the switching power supply; (ii) generating a ripple voltage signal having a predetermined constant value when a power switch of the switching power supply is on, and a linearly decreasing value when the power switch is off; (iii) generating a regulating voltage signal according to an output voltage sense signal and the ripple voltage signal; (iv) generating a regulating control signal by comparing the regulating voltage signal against a first reference signal; (v) generating an on time control signal according to the regulating control signal and the ideal on time signal; and (vi) generating a driving signal according to the on time control signal for driving the power switch.

14 Claims, 9 Drawing Sheets

CONTROL METHOD AND CONTROL CIRCUIT FOR SWITCHING POWER SUPPLY

RELATED APPLICATIONS

This application claims the benefit of Chinese Patent Application No. 201310615689.4, filed on Nov. 26, 2013, which is incorporated herein by reference in its entirety.

FIELD OF THE INVENTION

The present invention relates to the field of power electronics, and more particularly to control methods and circuits for a switching power supply.

BACKGROUND

Switch mode power supplies (SMPSs) or "switching" power supplies can efficiently convert electrical power from a source to a load (e.g., a light-emitting diode [LED] load), or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a method of controlling a switching power supply can include: (i) generating an ideal on time signal according to an input voltage and an output voltage of the switching power supply; (ii) generating a ripple voltage signal having a predetermined constant value when a power switch of the switching power supply is on, and a linearly decreasing value when the power switch is off; (iii) generating a regulating voltage signal according to an output voltage sense signal and the ripple voltage signal; (iv) generating a regulating control signal by comparing the regulating voltage signal against a first reference signal; (v) generating an on time control signal according to the regulating control signal and the ideal on time signal; and (vi) generating a driving signal according to the on time control signal for driving the power switch.

In one embodiment, an control circuit for a switching power supply can include: (i) an on time generating circuit configured to generate an ideal on time signal according to an input voltage and an output voltage of the switching power supply; (ii) an on time generating circuit configured to generate an ideal on time signal according to an input voltage and an output voltage of the switching power supply; (iii) a ripple generating circuit configured to generate a ripple voltage signal having a predetermined constant value when a power switch of the switching power supply is on, and a linearly decreasing value when the power switch is off; (iv) a sampling circuit configured to sense the output voltage of the switching power supply, and to generate an output voltage sense signal; (v) a comparison circuit configured to generate a regulating voltage signal according to the output voltage sense signal and the ripple voltage signal, and to generate a regulating control signal by a comparison of the regulating voltage signal against a first reference signal; and (vi) a driving circuit configured to generate an on time control signal according to the regulating control signal and the ideal on time signal, and to generate a driving signal for the power switch according to the on time control signal.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switching power supplies are used for supplying voltages to loads, such as circuit systems and/or electronic products. A step-down switching power supply is one of the most widely used types of switching mode power supplies. In a step-down switching power supply, a duty cycle may be close to 1 if an output voltage is to be equivalent to an input voltage, and the duty cycle may be 1 under ideal situations.

Figure 1:
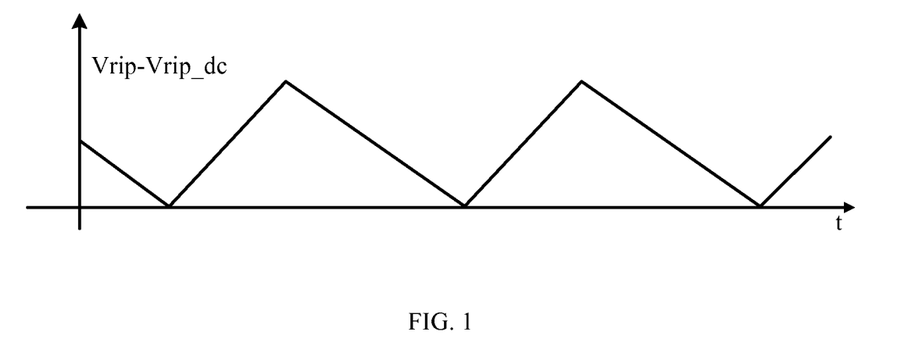
FIG. 1 is a waveform diagram of an example ripple voltage with respect to an example control circuit.

Referring now to FIG. 1, shown is a waveform diagram of an example ripple voltage with respect to an example control circuit. In a step-down switching power supply, the duty cycle can be increased to be close to 1 by extending an on time of power switch Qt (see, e.g., FIG. 6) via a comparator. However, in some cases, an input terminal of the comparator can receive a voltage source with a voltage that is a "ripple" voltage or sawtooth waveform generated by ripple generating circuit 602 (e.g., Vrip-Vrip_dc of FIG. 1). When the duty cycle is relatively small, a practical or actual on time of power switch Qt may be greater than an ideal on time with this approach.

Figure 2:
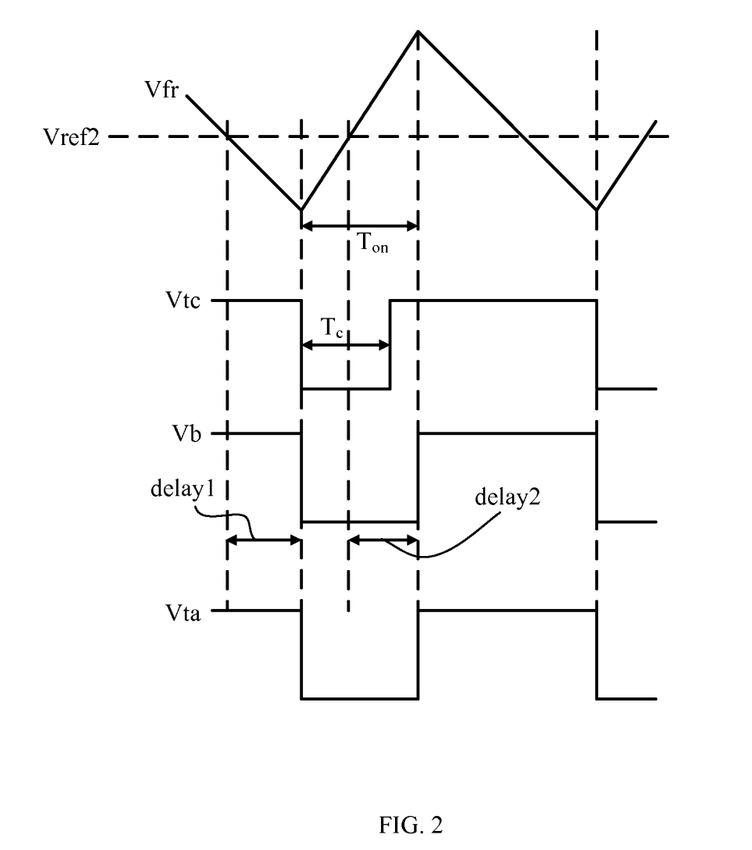
FIG. 2 is a waveform diagram showing example operation of a control circuit.

Referring now to FIG. 2 is a waveform diagram showing example operation of a control circuit. Because of inherent delay found in the comparator (e.g., A2), a regulating control signal (e.g., Va) provided by the comparator may be delayed. Thus, complementary regulating control signal Vb obtained by inverting regulating control signal Va may also be delayed (e.g., represented as delay time "delay1"). When regulating voltage signal Vfr rises from a "valley" or minimum value, complementary regulating control signal Vb can remain low until regulating voltage signal Vfr reaches a level of a reference voltage signal (e.g., Vref2). Then, regulating voltage signal Vfr can continue to rise to a peak level, and complementary regulating control signal Vb can remain low for another delay time "delay2," which can be equal to delay1 in some cases.

When the duty cycle is relatively small, ideal on time signal Vtc can wait for arrival of an edge of complementary regulating control signal Vb to generate on time control signal Vta. However, because the delay time (e.g., delay1+delay2) of complementary regulating voltage signal Vb can be relatively large, on time $T_{on}$ corresponding to on time control signal Vta may be greater than on time Tc corresponding to ideal on time signal Vtc. As a result, the "practical" on time of power switch Qt may not be equal to the designed or ideal on time.

Figure 3:
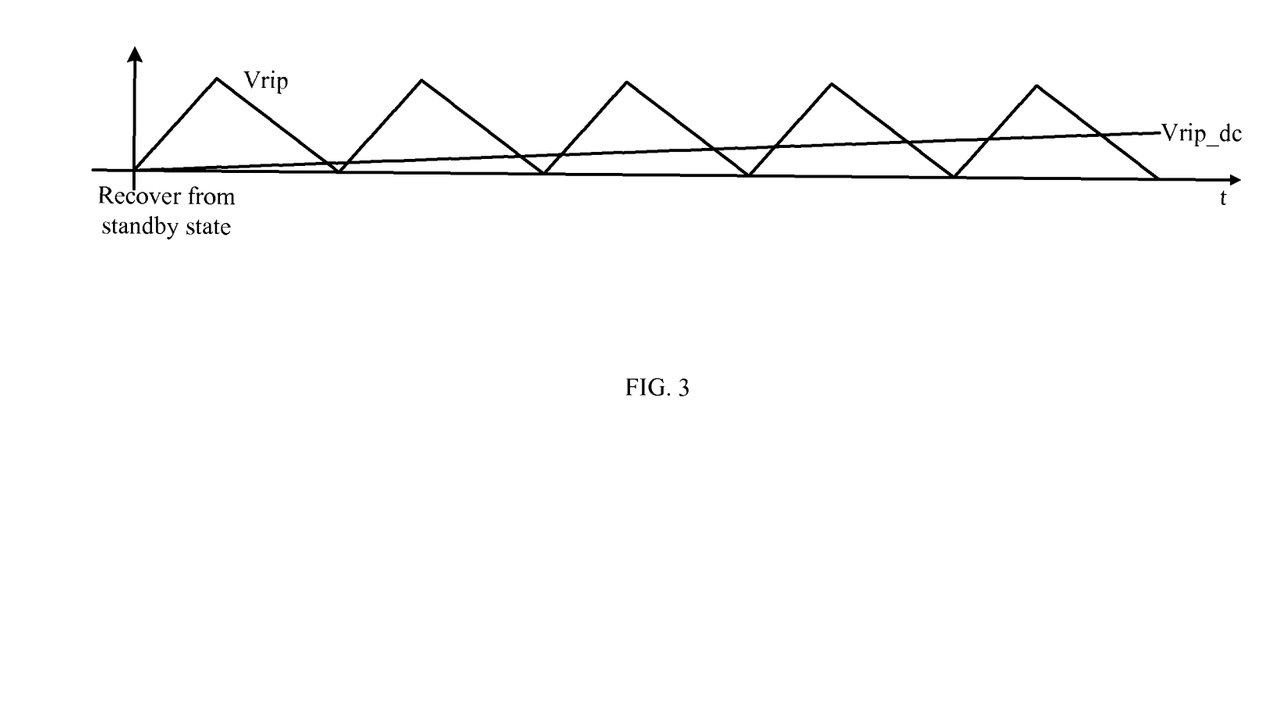
FIG. 3 is a waveform diagram of an example ripple voltage with respect to an example control circuit.

Referring now to FIG. 3, shown is a waveform diagram of an example ripple voltage with respect to an example control circuit. When the switching power supply is under a light load condition and recovers from standby state, DC ripple voltage Vrip_dc can increase as time goes on. In this case, ripple voltage Vrip-Vrip_dc may be negative, and the interaction of ripple voltage Vrip-Vrip_dc and output voltage sense signal Vfb obtained by sampling an output voltage Vo, can result in an inductor current that is too high, and a ripple voltage that is too large.

In one embodiment, a method of controlling a switching power supply can include: (i) generating an ideal on time signal according to an input voltage and an output voltage of the switching power supply; (ii) generating a ripple voltage signal having a predetermined constant value when a power switch of the switching power supply is on, and a linearly decreasing value when the power switch is off; (iii) generating a regulating voltage signal according to an output voltage sense signal and the ripple voltage signal; (iv) generating a regulating control signal by comparing the regulating voltage signal against a first reference signal; (v) generating an on time control signal according to the regulating control signal and the ideal on time signal; and (vi) generating a driving signal according to the on time control signal for driving the power switch.

In one embodiment, an control circuit for a switching power supply can include: (i) an on time generating circuit configured to generate an ideal on time signal according to an input voltage and an output voltage of the switching power supply; (ii) an on time generating circuit configured to generate an ideal on time signal according to an input voltage and an output voltage of the switching power supply; (iii) a ripple generating circuit configured to generate a ripple voltage signal having a predetermined constant value when a power switch of the switching power supply is on, and a linearly decreasing value when the power switch is off; (iv) a sampling circuit configured to sense the output voltage of the switching power supply, and to generate an output voltage sense signal; (v) a comparison circuit configured to generate a regulating voltage signal according to the output voltage sense signal and the ripple voltage signal, and to generate a regulating control signal by a comparison of the regulating voltage signal against a first reference signal; and (vi) a driving circuit configured to generate an on time control signal according to the regulating control signal and the ideal on time signal, and to generate a driving signal for the power switch according to the on time control signal.

Figure 4:
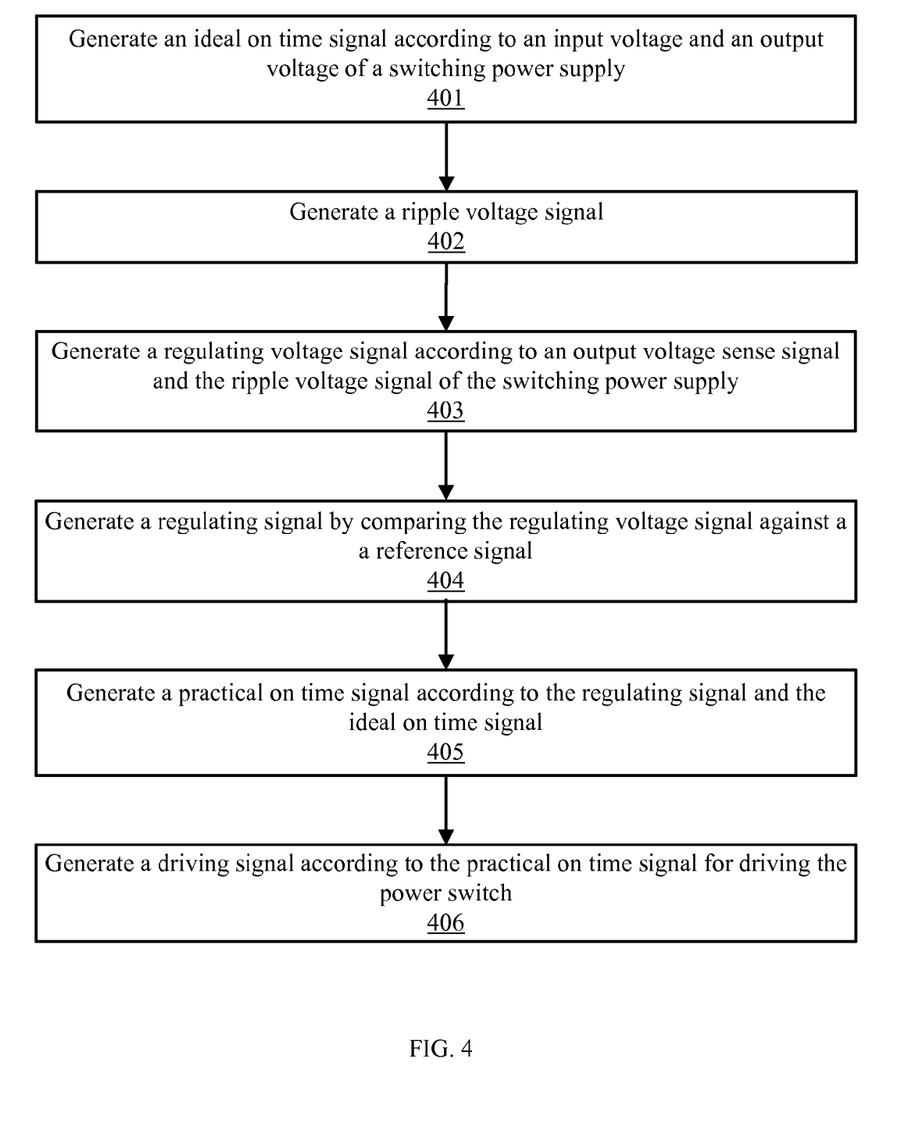
FIG. 4 is a flow diagram of an example method of controlling a switching power supply, in accordance with embodiments of the present invention.

Referring now to FIG. 4, shown is a flow diagram of an example method of controlling a switching power supply, in accordance with embodiments of the present invention. At 401, an ideal on time signal (e.g., Vtc) can be generated according to an input voltage (e.g., Vin) and an output voltage (e.g., Vo) of the switching power supply. Here, an on time generating circuit (e.g., 601) may be designed to generate ideal on time signal Vtc based on design constraints, and according to the input and output voltages of the switching power supply. Thus, ideal on time signal Vtc may be related to input voltage Vin and output voltage Vo of the switching power supply.

For example, when power switch Qt is on, capacitor C1 can be charged by current source Is1. In each switching cycle of the switching power supply, a voltage across capacitor C1 can be an ideal regulating voltage signal. This ideal regulating voltage signal can be compared (e.g., via comparator A1) against reference voltage signal Vref1, in order to generate ideal on time signal Vtc. For example, current source Is1 can be in direct proportion to input voltage Vin (e.g., Is1=k1*Vin), and reference voltage Vref1 can be in direct proportion to output voltage Vo (e.g., Vref1=k2*Vo), where k1 and k2 can be any positive numbers. For example, input voltage Vin can be about 400V, output voltage Vo can be about 160V, and the operating frequency can be about 100 kHz. Thus in this example, a duty cycle D can be about 160/400=0.4, and the ideal on time Tc can be about 0.4/100 k=4 ms.

When power switch Qt is off, switch S1 may be on to discharge capacitor C1. Thus, the voltage across capacitor C1 may be zero. When the power switch Qt is on, switch S1 may be off, and capacitor C1 can be charged by current source Is1. When the voltage across capacitor C1 reaches a level of reference voltage Vref1, comparator A1 may output a high level, and power switch Qt can accordingly be turned off.

Figure 5:
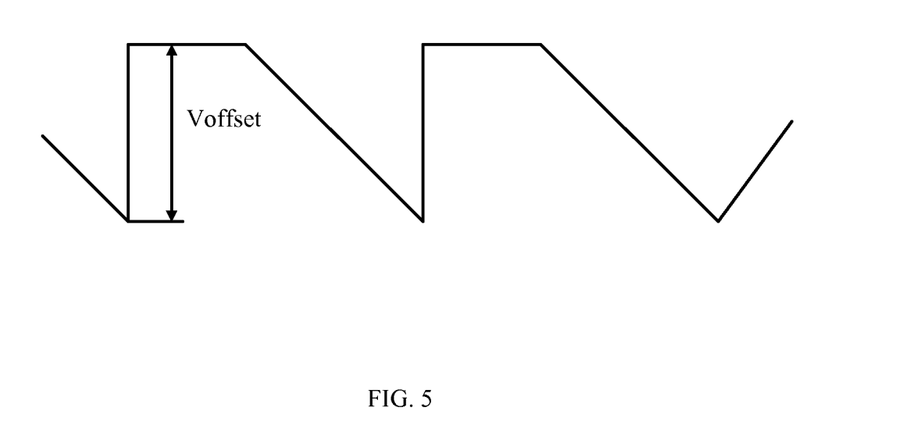
FIG. 5 is a waveform diagram of an example ripple voltage signal, in accordance with embodiments of the present invention.

At 402, a ripple voltage signal (e.g., Vrip) can be generated (e.g., via ripple generating circuit 602). FIG. 5 shows a waveform diagram of an example ripple voltage signal, in accordance with embodiments of the present invention. When power switch in the switching power supply Qt is on, a voltage value of ripple voltage signal Vrip can be a predetermined constant voltage value. When power switch Qt is off, the voltage value of ripple voltage signal Vrip can linearly decreases from the constant voltage value. When power switch Qt is on, and switch S2 is on (see, e.g., ripple generating circuit 902 in FIG. 9), a voltage across capacitor C2 can be voltage Voffset of a bias voltage source.

Figure 9:
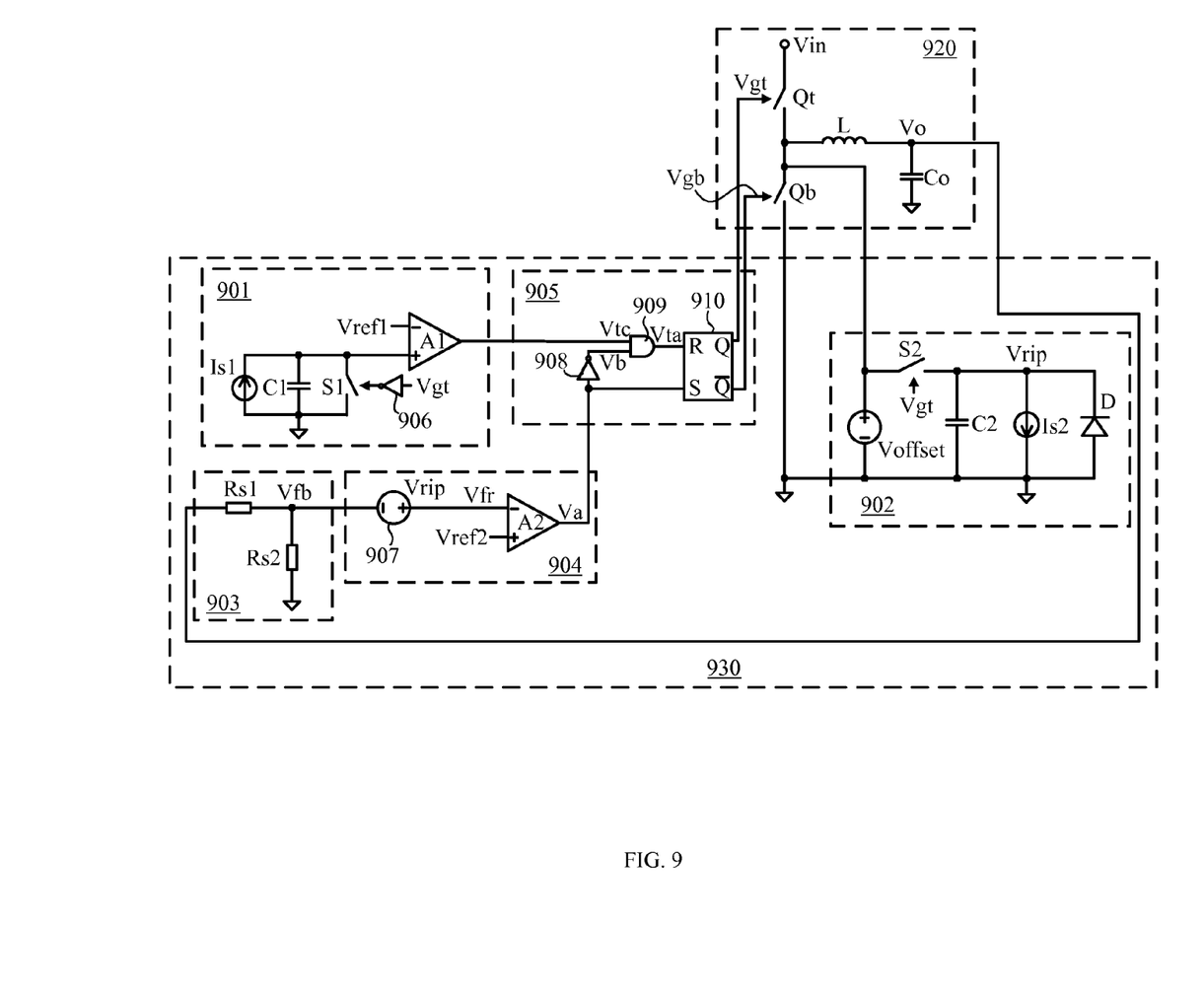
FIG. 9 is a schematic block diagram of an example switching power supply and control circuit, in accordance with embodiments of the present invention.

When power switch Qt is off, switch S2 may be off, and capacitor C2 can be discharged by current source Is2. Thus, the voltage across capacitor C2 may gradually decrease from voltage Voffset of the bias voltage source. In this way, ripple voltage signal Vrip can be generated across capacitor C2. In addition, and as shown in ripple generating circuit 902, clamping diode D can connect in parallel with capacitor C2. When the voltage across capacitor C2 is negative, clamping diode D can be turned on, and the voltage across capacitor C2 can be clamped to zero, or a diode drop below zero. For example, current source Is2 can be in direct proportion to output voltage Vo (e.g., Is2=k3*Vo), and k3 can be any positive number. Thus, the decreasing slope of ripple voltage signal Vrip can be k3*Vo.

Figure 8:
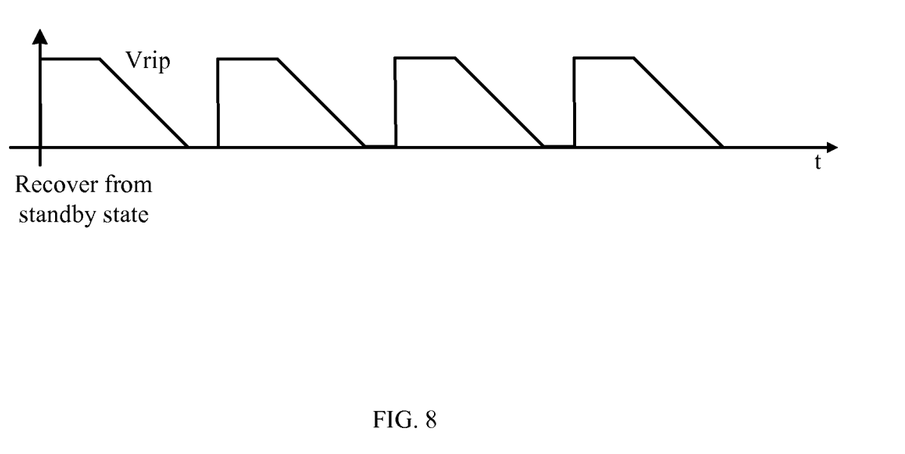
FIG. 8 is a waveform diagram of an example ripple voltage signal when the switching power supply recovers from a standby state, in accordance with embodiments of the present invention.

Referring now to FIG. 8, shown is a waveform diagram of an example ripple voltage signal when the switching power supply recovers from a standby state, in accordance with embodiments of the present invention. Ripple voltage signal Vrip can change to Voffset instantly when the circuit recovers from the standby state. When power switch Qt is turned off, ripple voltage signal Vrip may linearly decrease until reaching a level of zero. Capacitor C2 may stop discharging due to clamping diode D, so ripple voltage signal Vrip can be clamped to essentially zero instead of a negative value, until power switch Qt is turned on again. In this way, the inductor current and the ripple voltage can be prevented from being too high due to potential negative values of the ripple voltage.

Figure 6:
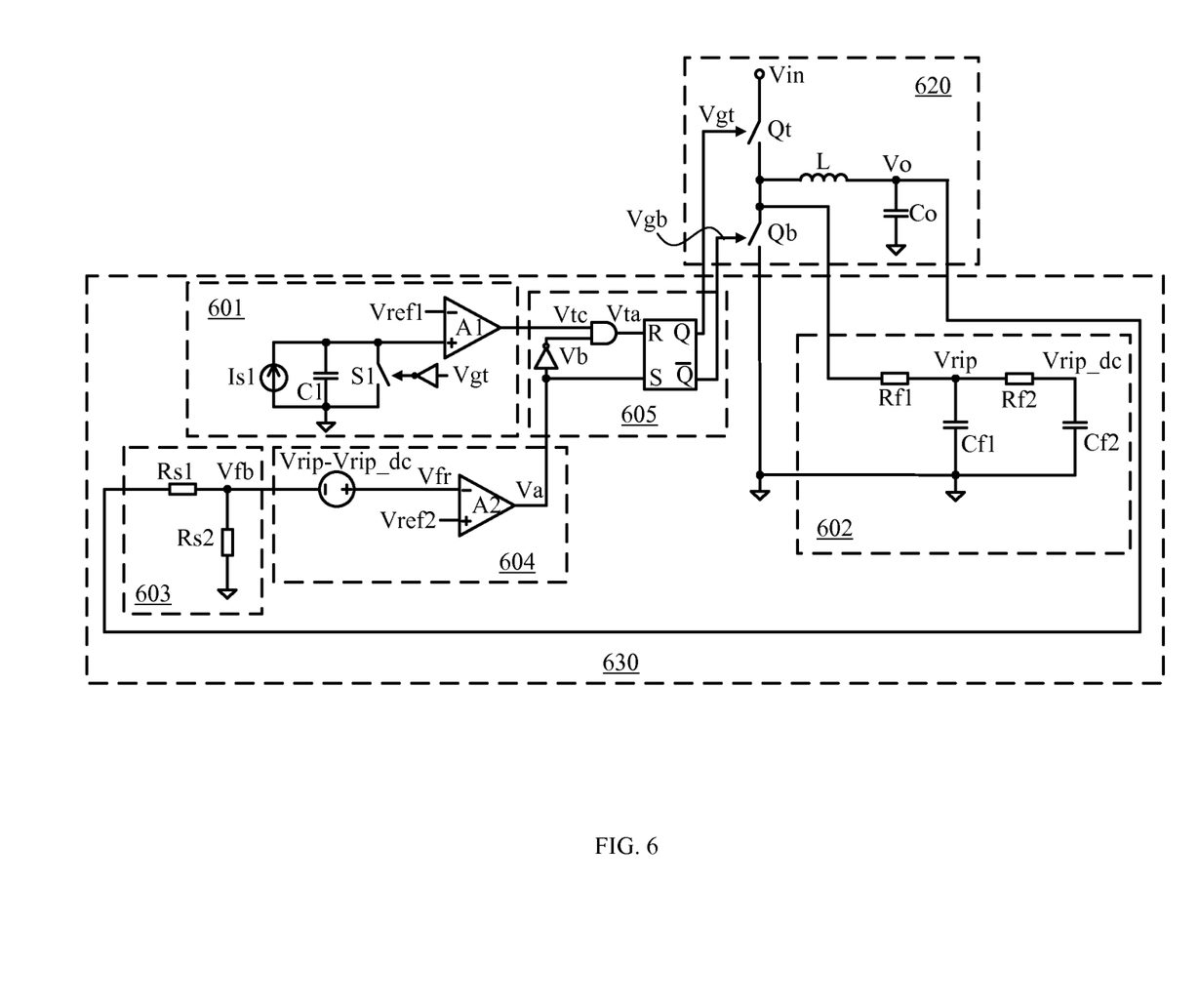
FIG. 6 is a schematic block diagram of an example switching power supply and control circuit, in accordance with embodiments of the present invention.

At 403, a regulating voltage signal (e.g., Vfr) can be generated (e.g., via sampling circuit 603/903) according to output voltage sense signal Vfb and ripple voltage signal Vrip of the switching power supply. Here, output voltage sense signal Vfb can be obtained by sampling output voltage Vo of the switching power supply, and regulating voltage signal Vfr can be obtained according to output voltage sense signal Vfb and ripple voltage signal Vrip. For example, regulating voltage signal Vfr may represent a present output state of the switching power supply, which can change along with ripple voltage signal Vrip. Regulating voltage signal Vfr can be generated by adding output voltage sense signal Vfb to ripple voltage signal Vrip (e.g., regulating voltage signal Vfr may be equal to Vfb+Vrip).

At 404, regulating voltage signal Vfr can be compared (e.g., via comparison circuit 604/904) against a predetermined reference signal (e.g., Vref2), to generate a regulating control signal (e.g., Va). For example, comparison circuit 604/904 can include comparator A2, which may have a non-inverting input terminal for receiving reference voltage Vref2, and an inverting input terminal for receiving regulating voltage signal Vfr, and an output terminal for generating regulating control signal Va to driving circuit 605/905.

Referring now to FIG. 6, shown is a schematic block diagram of an example switching power supply and control circuit 630, in accordance with embodiments of the present invention. Main power circuit 620 can include top and bottom power switches Qt and Qb, as well as inductor L and output capacitor Co. The same or similar elements can be found in power circuit 920 of FIG. 9. Ripple generating circuit 602 can include resistors Rf1 and Rf2 and capacitors Cf1 and Cf2. Sampling circuit 603 can include resistors Rs1 and Rs2. The same or similar elements can be found in sampling circuit 903 of FIG. 9.

Comparison circuit 604 can include comparator A2, which can be the same or similar to comparison circuit 904 of FIG. 9. Driving circuit 605 can include a flip-flop, and inverter, and an AND-gate, which may be the same or similar elements as found in driving circuit 905 of FIG. 9. On time generating circuit 601 can include current source Is1, capacitor C1, switch (e.g., transistor) S1, comparator A1, and an inverter. The same or similar elements can be found in on time generating circuit 901 of FIG. 9. This other example control circuit and switching power supply structure of FIG. 9 will be discussed in more detail below.

Figure 7:
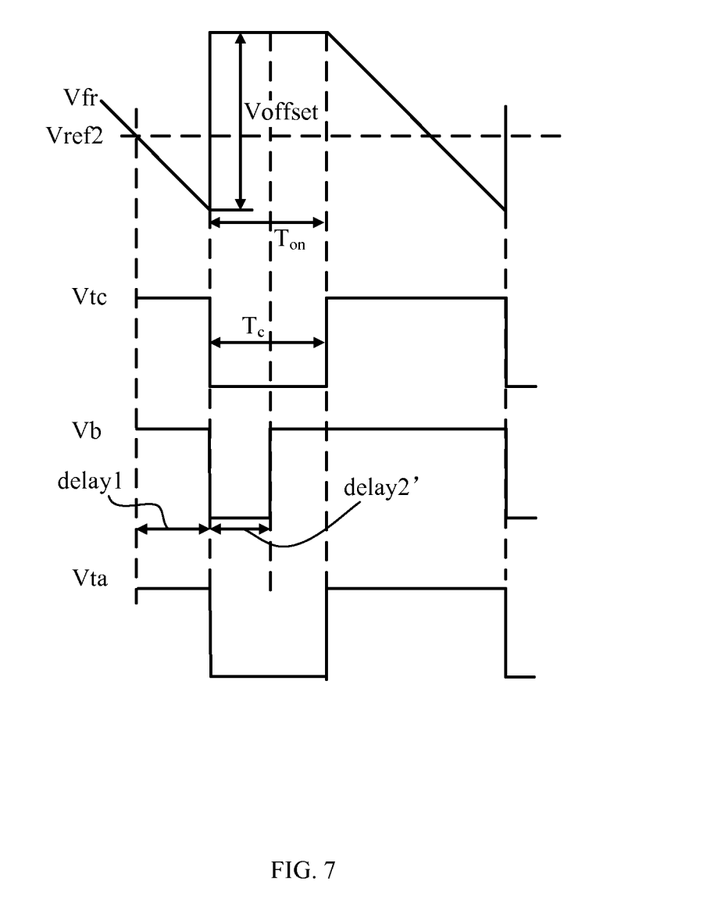
FIG. 7 is a waveform diagram showing example operation of a control circuit, in accordance with embodiments of the present invention.

Referring now to FIG. 7, shown is a waveform diagram showing example operation of a control circuit, in accordance with embodiments of the present invention. For example, regulating control signal Va can be provided to set terminal S of a flip-flop, and this signal may be delayed because of the inherent delay of comparator A2. At 405 in FIG. 4, an on time control signal or a practical on time signal can be generated according to regulating control signal Va and ideal on time signal Vtc. On time control signal Vta can be generated according to ideal on time signal Vtc indicative of a designed or ideal on time, and regulating control signal Va can be configured for increasing the duty cycle.

Generating on time control signal Vta can include inverting regulating control signal Va to obtain complementary regulating control signal Vb. Complementary regulating control signal Vb and ideal on time signal Vtc can be provided to AND-gate circuit for a logical-AND operation, in order to generate on time control signal Vta at driving circuit 605/905. At 406 of FIG. 4, a driving signal (e.g., Vt) can be generated (e.g., via driving circuit 605/905) according to on time control signal Vta for driving the power switches (e.g., Qt and Qb). Driving signals Vgt and Vgb can be provided to corresponding control terminals (e.g., transistor gates) of the power switches for controlling on and off power switch states, and thus to control the output of the switching power supply.

Referring now to FIG. 9, shown is a schematic block diagram of an example switching power supply and control circuit, in accordance with embodiments of the present invention. In this example, control circuit 930 can include on time generating circuit 901, ripple generating circuit 902, sampling circuit 903, comparison circuit 904, and driving circuit 905. In some cases, the circuit blocks of FIG. 9 may be the same or similar to corresponding blocks in FIG. 6, and are labeled beginning with a '9' instead of a '6' in most cases. The ripple voltage waveform of the circuit in FIG. 6 under normal operation can be as shown in FIG. 1, under a state just recovering from a standby state can be as shown in FIG. 3, and an operation waveform thereof under normal operation can be as shown in FIG. 2.

Comparing the waveforms of FIGS. 2 and 7, when power switch Qt of the switching power supply is on, ripple voltage signal Vrip may instantly rise to a level of constant voltage Voffset. Time delay delay2 of complementary regulating control signal Vb, can be reduced to delay2', in order to assure that delay2' is less than an ideal on time Tc corresponding to ideal on time signal Vtc. Also, complementary regulating control signal Vb may wait for ideal on time signal Vtc such that on time control signal Vta generated according to ideal on time signal Vtc and complementary regulating control signal Vb can be controlled by ideal on time signal Vtc. Thus, practical on time $T_{on}$ can be consistent with ideal on time Ttc. In this way, the practical on time of the power switch(es) in the switching power supply can be substantially consistent with the ideal on time.

Ripple generating circuit 902 can receive driving signal Vgt for controlling power switch Qt of the switching power supply. An input terminal of sampling circuit 903 can connect to an output terminal of the switching power supply. An input terminal of comparison circuit 904 can connect to sampling circuit 903 and ripple generating circuit 902. An input terminal of the driving circuit 905 can connect to output terminals of on time generating circuit 901 and comparison circuit 904, and an output terminal of driving circuit 905 can connect to a control terminal (e.g., transistor gate) of power switch Qt of the switching power supply.

On time generating circuit 901 can generate ideal on time signal Vtc according to input voltage Vin and output voltage Vo of the switching power supply. Ripple generating circuit 902 can generate ripple voltage signal Vrip (see, e.g., FIG. 5). When power switch Qt is on, ripple voltage signal Vrip may be at a level of a predetermined constant voltage. When power switch Qt is off, ripple voltage signal Vrip can linearly decrease. Sampling circuit 903 can obtain output voltage sense signal Vfb of the switching power supply. Comparison circuit 904 can generate regulating voltage signal Vfr according to output voltage sense signal Vfb and ripple voltage signal Vrip. Comparison circuit 904 can compare regulating voltage signal Vfr against reference signal Vref2 to generate regulating control signal Va. Driving circuit 905 can generate on time control signal Vta according to regulating control signal Va and ideal on time signal Vtc, may also generate driving signal(s) Vgt/Vgb according to on time control signal Vta for driving power switches Qt and Qb in main power circuit 920.

In this way, the practical on time of power switch Qt of the switching power supply can substantially consistent with the ideal on time. For example, on time generating circuit 901 can include switch S1, inverter 906, current source Is1, capacitor C1, and comparator A1. Inverter 906 may have an input terminal for receiving driving signal Vgt of power switch Qt, and an output terminal coupled to a control terminal of switch S1 for controlling on and off states of switch S1. One terminal of current source Is1, capacitor C1, and switch S1 can be coupled to a non-inverting input terminal of comparator A1, and the other terminals of current source Is1, capacitor C1, and switch S1 can be coupled to ground.

Reference voltage signal Vref1 can be provided to an inverting input terminal of comparator A1. When power switch Qt is off, switch S1 may be on, and the voltage across capacitor C1 may be discharged to zero via switch S1. When power switch Qt is on, switch S1 may be off, and capacitor C1 may be charged by current source Is1. The voltage across capacitor C1 can gradually increase, and may be the ideal regulating voltage signal. Comparator A1 can compare the ideal regulating voltage signal against reference voltage signal Vref1, and may output a comparison result as ideal on time signal Vtc.

For example, current source Is1 may be in direct proportion to input voltage Vin (e.g., Is1=k1*Vin), and reference voltage Vref1 may be in direct proportion to output voltage Vo (e.g., Vref1=k2*Vo), where k1 and k2 can be any positive numbers. Ripple generating circuit 902 can include switch S2, bias voltage source Voffset, capacitor C2, and current source Is2. A control terminal of switch S2 can receive driving signal Vgt of power switch Qt. Also, bias voltage source Voffset may be coupled in series to capacitor C2 through switch S2. One common node of bias voltage source Voffset and capacitor C2 can connect to ground, and current source Is2 can connect in parallel to capacitor C2.

When power switch Qt is on, switch S2 may be on, and a circuit loop between bias voltage source Voffset and capacitor C2 may be on. The voltage across capacitor C2 may be a voltage of bias voltage source Voffset. When power switch Qt is off, switch S2 may be off, capacitor C2 may be discharged by current source Is2, and the voltage across capacitor C2 may gradually decrease. In this example, the voltage across capacitor C2 may be ripple voltage signal Vrip.

Ripple generating circuit 902 can also include clamping diode D with an anode coupled to a first terminal of capacitor C2 and a positive end of current source Is2, and a cathode coupled to a second terminal of capacitor C2 and a negative end of current source Is2 to ground. When power switch Qt is off, switch S2 may be off, and capacitor C2 may be discharged by current source Is2. If the voltage across capacitor C2 is linearly decreased to be negative, clamping diode D may turn on to clamp ripple voltage signal Vrip at substantially zero. In this way, ripple voltage signal Vrip may not be substantially negative, and potentially large inductor current and ripple voltages can be substantially prevented. For example, current source Is2 can be in direct proportion to output voltage Vo (e.g., Is2=k3*Vo), where k3 can be any positive number. Thus, the decreasing slop of ripple voltage signal Vrip may be k3*Vo.

Comparison circuit 904 can include voltage source 907 and comparator A2. For example, the voltage of voltage source 907 may be ripple voltage signal Vrip. Voltage source 907 can connect between the output terminal of sampling circuit 903 and an inverting input terminal of comparator A2. Voltage signal Vrf provided to the inverting input terminal of comparator A2 may be a sum of voltage sense signal Vfb and ripple voltage signal Vrip (e.g., Vfr=Vfb+Vrip. Regulating voltage signal Vfr can reflect a present output state of the switching power supply, and may change along with ripple voltage signal Vrip. A non-inverting input terminal of comparator A2 can receive predetermined reference voltage signal Vref2. Comparator A2 can compare regulating voltage signal Vfr against reference voltage signal Vref2, and may provide a comparison result as regulating control signal Va.

Driving circuit 905 can include inverter 908, AND-gate 909, and RS flip-flop 910. Inverter 908 can connect between an output terminal of comparison circuit 904 and a first input terminal of AND-gate circuit 909. A second input terminal of AND-gate 909 can connect to an output terminal of on time generating circuit 901. An output terminal of AND-gate circuit 909 can connect to reset terminal R of RS flip-flop 910. Set terminal S of RS flip-flop 910 can connect to an output terminal of comparison circuit 904, and an output terminal Q of RS flip-flop 910 can connect to a control terminal (e.g., transistor gate) of power switch Qt.

Inverter 908 may be used to invert regulating control signal Va to obtain complementary regulating control signal Vb. AND-gate 909 can perform a logical-AND operation on complementary regulating control signal Vb and ideal on time signal Vtc to generate on time control signal Vta. RS flip-flop 910 can generate driving signal Vgt for power switch Qt at output terminal Q under the control of on time control signal Vta and regulating control signal Va. Similarly, RS flip-flop 910 can generate driving signal Vgb for power switch Qb at the complementary output terminal. Example operation waveforms of complementary regulating control signal Vb, ideal on time signal Vtc, and on time signal Vta as provided to reset terminal R of RS flip-flop 910 are shown in FIG. 7.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of controlling a switching power supply, the method comprising:
   a) generating an ideal on time signal according to an input voltage and an output voltage of said switching power supply;
   b) generating a ripple voltage signal having a predetermined constant value when a power switch of said switching power supply is on, and a linearly decreasing value when said power switch is off;
   c) generating a regulating voltage signal according to an output voltage sense signal and said ripple voltage signal;
   d) generating a regulating control signal by comparing said regulating voltage signal against a first reference signal;

e) generating an on time control signal according to said regulating control signal and said ideal on time signal; and f) generating a driving signal according to said on time control signal for driving said power switch.

2. The method of claim 1, wherein said generating said ideal on time signal comprises:

a) charging a first capacitor by a first current source when said power switch is on, wherein a voltage across said first capacitor comprises an ideal regulating voltage signal; and b) generating said ideal on time signal by comparing a second reference voltage signal against said ideal regulating voltage signal.

3. The method of claim 1, wherein said generating said ripple voltage signal comprises:

a) charging a second capacitor by a second current source such that a voltage across said second capacitor linearly decreases when said power switch is off; and b) wherein said voltage across said second capacitor equals a predetermined value of a bias voltage source when said power switch is on, and wherein said voltage across said second capacitor is configured as said ripple voltage signal.

4. The method of claim 3, wherein said charging said second capacitor by said second current source comprises discharging said second capacitor by said second current source, until said ripple voltage signal linearly decreases to zero when said power switch is off.

5. The method of claim 1, wherein said generating said regulating voltage signal comprises adding said output voltage sense signal to said ripple voltage signal.

6. The method of claim 1, wherein said generating said on time control signal comprises:

a) generating a complementary regulating control signal by inverting said regulating control signal; and b) generating said on time control signal by performing a logical-AND operation on said complementary regulating control signal and said ideal on time signal.

7. The method of claim 1, wherein generating said driving signal comprises using a flip-flop having a set terminal coupled to said regulating control signal, and a reset terminal coupled to said on time control signal.

8. A control circuit for a switching power supply, comprising:

a) an on time generating circuit configured to generate an ideal on time signal according to an input voltage and an output voltage of said switching power supply;

b) a ripple generating circuit configured to generate a ripple voltage signal having a predetermined constant value when a power switch of said switching power supply is on, and a linearly decreasing value when said power switch is off;

c) a sampling circuit configured to sense said output voltage of said switching power supply, and to generate an output voltage sense signal;

d) a comparison circuit configured to generate a regulating voltage signal according to said output voltage sense signal and said ripple voltage signal, and to generate a regulating control signal by a comparison of said regulating voltage signal against a first reference signal; and e) a driving circuit configured to generate an on time control signal according to said regulating control signal and said ideal on time signal, and to generate a driving signal for said power switch according to said on time control signal.

9. The control circuit of claim 8, wherein said on time generating circuit comprises:

a) a first inverter configured to receive said driving signal, and having an output terminal coupled to a control terminal of a first switch;

b) a first current source, a first capacitor, and said first switch being coupled to ground and to a first input terminal of a first comparator;

c) said first comparator having a second input terminal configured to receive a second reference voltage signal;

d) said first switch being on when said power switch is off, and said first switch being off when said power switch is on; and e) said first capacitor is configured to be charged by said first current source, wherein a voltage across said first capacitor comprises an ideal regulating voltage signal, wherein said first comparator is configured to generate said ideal on time signal by comparison of said second reference voltage signal against said ideal regulating voltage signal.

10. The control circuit of claim 8, wherein said ripple generating circuit comprises:

a) a second switch controllable by said driving signal;

b) a second capacitor having a bias voltage source coupled in series thereto through said second switch; and c) a second current source coupled to said second capacitor, wherein said second capacitor is configured to be discharged by said second current source to linearly decrease a voltage across said second capacitor when said second switch is off, and wherein said voltage across said second capacitor is configured as said ripple voltage signal.

11. The control circuit of claim 10, wherein said ripple generating circuit further comprises a clamping diode coupled to said second capacitor and said second current source.

12. The control circuit of claim 8, wherein said comparison circuit comprises:

a) a voltage source configured as said ripple voltage signal, wherein said voltage source is coupled in series between said sampling circuit and a second comparator, wherein said second comparator is configured to receive a second reference voltage signal; and b) said second comparator is configured to generate said regulating control signal by comparison of said regulating voltage signal against said second reference signal.

13. The control circuit of claim 8, wherein said driving circuit comprises:

a) a second inverter is coupled between said comparison circuit and an AND-gate circuit, wherein said second inverter is configured to invert said regulating control signal; and b) flip-flop having a reset terminal coupled to an output of said AND-gate circuit, a set terminal coupled to an output of said comparison circuit, and an output terminal coupled to said power switch and being configured as said driving signal.

14. A switching power supply, comprising:

a) a power stage circuit having said power switch; and b) said control circuit of claim 8 being configured to generate said driving signal for controlling said power switch.

* * * * *